(12) United States Patent
Serrill et al.

(10) Patent No.: US 11,906,470 B2
(45) Date of Patent: Feb. 20, 2024

(54) PROBE, SYSTEM, AND METHOD FOR NON-DESTRUCTIVE ULTRASONIC INSPECTION

(71) Applicant: The Boeing Company, Chicago, IL (US)

(72) Inventors: Justin D. Serrill, Issaquah, WA (US); Hien T. Bui, Renton, WA (US); Shereef G. Shehab, Seattle, WA (US)

(73) Assignee: The Boeing Company, Arlington, VA (US)

( * ) Notice: Subject to any disclaimer, the term of this patent is extended or adjusted under 35 U.S.C. 154(b) by 217 days.

(21) Appl. No.: 17/546,795

(22) Filed: Dec. 9, 2021

(65) Prior Publication Data
US 2022/0214315 A1    Jul. 7, 2022

Related U.S. Application Data

(60) Provisional application No. 63/133,664, filed on Jan. 4, 2021.

(51) Int. Cl.
*G01N 29/265* (2006.01)
*G01N 29/24* (2006.01)
(Continued)

(52) U.S. Cl.
CPC ........... *G01N 29/265* (2013.01); *G01N 29/24* (2013.01); *G01N 29/28* (2013.01); *G01N 29/225* (2013.01)

(58) Field of Classification Search
CPC ...... G01N 29/265; G01N 29/24; G01N 29/28; G01N 29/225; G01N 29/043; G01N 29/262; G01N 2291/2694; G01N 2291/0231; G01N 2291/023; G01N 2291/0289; G01N 2291/043; G01N 2291/051;
(Continued)

(56) References Cited

U.S. PATENT DOCUMENTS 7,444,876 B2 *   11/2008  Sarr ..................... G01N 29/226
                                                        73/635
7,644,618 B2 *    1/2010  Fetzer .................. G01N 29/225
                                                        73/632
(Continued)

FOREIGN PATENT DOCUMENTS

EP    3021113 A1    5/2016
WO    0218958 A2    3/2002

OTHER PUBLICATIONS

EP Extended Search Report concerning EP Patent Application No. 20206927.4 dated Apr. 13. 2021.

*Primary Examiner* — Suman K Nath
(74) *Attorney, Agent, or Firm* — Kunzler Bean & Adamson

(57) ABSTRACT

Disclosed herein is a probe for non-destructively inspecting a hat stiffener. The probe comprises a body, which comprises an inspection surface and a slot formed in the inspection surface. The probe also comprises an ultrasonic-sensor assembly that is fixed to the body and open to the inspection surface via the slot. The probe further comprises a surface-engagement assembly, which comprises a first foot and a second foot. The surface-engagement assembly is movably coupled to the body such that the first foot and the second foot are on opposite ends of the slot of the body and the first foot and the second foot are movable relative to the body and the ultrasonic-sensor assembly.

20 Claims, 8 Drawing Sheets

(51) Int. Cl.
*G01N 29/28* (2006.01)
*G01N 29/22* (2006.01)

(58) Field of Classification Search
CPC ..... G01N 2291/105; G01N 2291/2632; G01N 2291/2638
See application file for complete search history.

(56) References Cited

U.S. PATENT DOCUMENTS

| | | |
|---|---|---|
| 9,127,971 B2 | 9/2015 | Sarr et al. |
| 9,395,339 B2 | 7/2016 | Sarr et al. |
| 9,746,447 B2 | 8/2017 | Fetzer et al. |
| 9,950,813 B2 | 4/2018 | Hafenrichter et al. |
| 10,184,916 B2 | 1/2019 | Sarr et al. |
| 11,035,831 B1 | 6/2021 | Fetzer et al. |
| 2007/0039390 A1 | 2/2007 | Duncan et al. |
| 2014/0305217 A1 | 10/2014 | Tapia et al. |
| 2015/0053015 A1* | 2/2015 | Sarr ................ G01N 29/24 73/632 |
| 2015/0226369 A1 | 8/2015 | Troy et al. |
| 2016/0123934 A1 | 5/2016 | Fetzer et al. |
| 2017/0284973 A1 | 10/2017 | Falter et al. |
| 2018/0238834 A1 | 8/2018 | Sekiguchi |
| 2020/0003734 A1 | 1/2020 | Troy et al. |

* cited by examiner

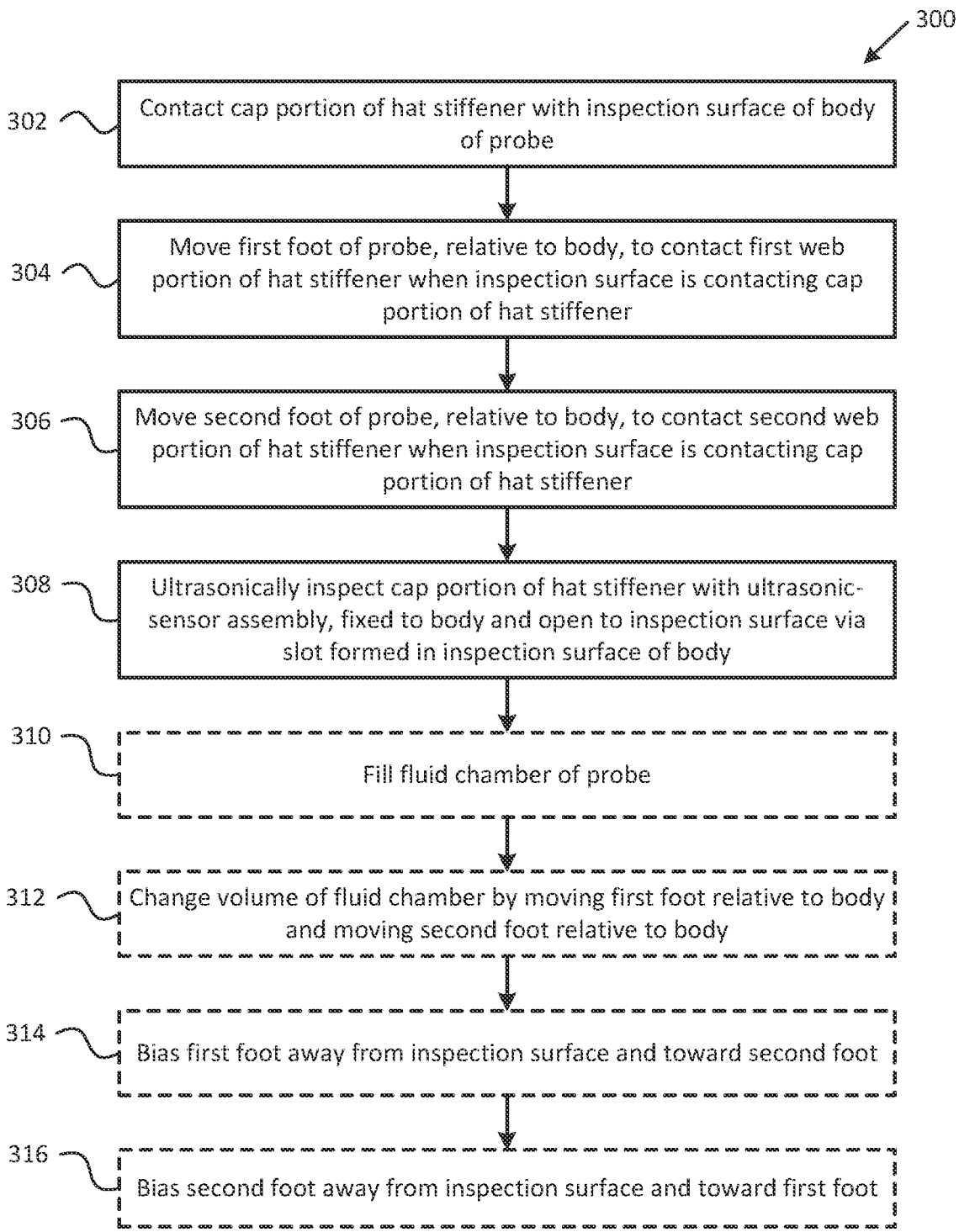

PROBE, SYSTEM, AND METHOD FOR NON-DESTRUCTIVE ULTRASONIC INSPECTION

FIELD

This disclosure relates generally to non-destructive inspection, and more particularly to non-destructive ultrasonic inspection of differently sized parts using the same probe.

BACKGROUND

Various parts, such as parts for aircraft, are non-destructively inspected prior, during, or after use. Some parts are made from laminated composite materials, which may inadvertently include abnormalities, such as cracks and voids. Accordingly, parts made from laminated composite materials are often non-destructively inspected to assess the quality of the parts and the presence of abnormalities.

According to one known method of non-destructive inspection, ultrasonic energy from an inspection probe is used to generate a representation or image of the interior of a part. The representation or image is used to identify abnormalities in the part. Some parts have unique sizes or shapes that require an inspection probe specifically designed to inspect the unique size or shape of a part. While appropriate for inspecting parts having a given size and shape, such specifically-designed probes are not conducive to inspecting parts having a different size or shape. Accordingly, in order to inspect parts having different sizes or shapes, many conventional techniques require multiple specifically-designed probes. In addition to the added cost of using multiple probes, the process of switching between multiple probes can be difficult and time consuming.

Some conventional probes are designed to inspect multiple parts having different sizes or shapes. However, such probes do not provide adequate fluid coupling between the probe and the part for accurate ultrasonic inspection.

SUMMARY

The subject matter of the present application provides examples of non-destructive inspection devices, systems, and methods that overcome the above-discussed shortcomings of prior art techniques. The subject matter of the present application has been developed in response to the present state of the art, and in particular, in response to shortcomings of current non-destructive inspection devices.

Disclosed herein is a probe for non-destructively inspecting a hat stiffener. The probe comprises a body, which comprises an inspection surface and a slot formed in the inspection surface. The probe also comprises an ultrasonic-sensor assembly that is fixed to the body and open to the inspection surface via the slot. The probe further comprises a surface-engagement assembly that comprises a first foot and a second foot. The surface-engagement assembly is movably coupled to the body such that the first foot and the second foot are on opposite ends of the slot of the body and the first foot and the second foot are movable relative to the body and the ultrasonic-sensor assembly. The preceding subject matter of this paragraph characterizes example 1 of the present disclosure.

The first foot is movable between a first retracted position and a first extended position. The first foot is further from the inspection surface in the first extended position than in the first retracted position. The second foot is movable between a second retracted position and a second extended position. The second foot is further from the inspection surface in the second extended position than in the second retracted position. The preceding subject matter of this paragraph characterizes example 2 of the present disclosure, wherein example 2 also includes the subject matter according to example 1, above.

The probe further comprises a first biasing mechanism that is coupled to the body and the surface-engagement assembly and configured to bias the first foot into the first extended position. The probe also comprises a second biasing mechanism that is coupled to the body and the surface-engagement assembly and is configured to bias the second foot into the second extended position. The preceding subject matter of this paragraph characterizes example 3 of the present disclosure, wherein example 3 also includes the subject matter according to example 2, above.

The first foot and the second foot are co-movable relative to each other. The preceding subject matter of this paragraph characterizes example 4 of the present disclosure, wherein example 4 also includes the subject matter according to any one of examples 2-3, above.

The surface-engagement assembly further comprises a crossbar that is movable relative to the body and the ultrasonic-sensor assembly and that intercouples the first foot and the second foot such that translational movement of the crossbar in a first direction away from the inspection surface corresponds with movement of the first foot toward the first retracted position and movement of the second foot toward the second retracted position and translational movement of the crossbar in a second direction toward the inspection surface and opposite the first direction corresponds with movement of the first foot toward the first extended position and movement of the second foot toward the second extended position. The preceding subject matter of this paragraph characterizes example 5 of the present disclosure, wherein example 5 also includes the subject matter according to example 4, above.

The body further comprises a guiderail. The crossbar comprises a guiderail slot slidably engaged with the guiderail such that the guiderail limits movement of the crossbar to the first direction and the second direction. The preceding subject matter of this paragraph characterizes example 6 of the present disclosure, wherein example 6 also includes the subject matter according to example 5, above.

The first foot and the second foot are slidable relative to the body along linear paths. The preceding subject matter of this paragraph characterizes example 7 of the present disclosure, wherein example 7 also includes the subject matter according to any one of examples 1-6, above.

The first foot is movable along a first path relative to the body. The second foot is movable along a second path relative to the body. An angle defined between the first path and the second path is perpendicular or oblique. The preceding subject matter of this paragraph characterizes example 8 of the present disclosure, wherein example 8 also includes the subject matter according to any one of examples 1-7, above.

The first foot comprises a first engagement surface configured to engage the hat stiffener. The first engagement surface is substantially perpendicular to the first path. The second foot comprises a second engagement surface configured to engage the hat stiffener. The second engagement surface is substantially perpendicular to the second path. The preceding subject matter of this paragraph characterizes example 9 of the present disclosure, wherein example 9 also includes the subject matter according to example 8, above.

The first foot comprises a first engagement surface configured to engage the hat stiffener. The first foot further comprises a first groove formed in the first engagement surface. The second foot comprises a second engagement surface configured to engage the hat stiffener. The second foot further comprises a second groove formed in the second engagement surface. The probe further comprises a fluid chamber open to the ultrasonic-sensor assembly and defined at least partially between the inspection surface of the body, the first groove, and the second groove. The fluid chamber is configured to receive a fluid during non-destructive inspection of the hat stiffener. A volume of the fluid chamber changes as the first foot and the second foot move relative to the body and the ultrasonic-sensor assembly. The preceding subject matter of this paragraph characterizes example 10 of the present disclosure, wherein example 10 also includes the subject matter according to any one of examples 1-9, above.

The first foot comprises a first engagement surface configured to engage the hat stiffener. The first foot further comprises opposing first beveled leading and trailing edges and the first engagement surface is interposed between the opposing first beveled leading and trailing edges of the first foot. The second foot comprises a second engagement surface configured to engage the hat stiffener. The second foot further comprises opposing second beveled leading and trailing edges and the second engagement surface is interposed between the opposing second beveled leading and trailing edges of the second foot. The preceding subject matter of this paragraph characterizes example 11 of the present disclosure, wherein example 11 also includes the subject matter according to any one of examples 1-10, above.

The first foot comprises a first engagement surface configured to engage the hat stiffener. The second foot comprises a second engagement surface configured to engage the hat stiffener. The first engagement surface and the second engagement surface are planar. The preceding subject matter of this paragraph characterizes example 12 of the present disclosure, wherein example 12 also includes the subject matter according to any one of examples 1-11, above.

Further disclosed herein is a system for non-destructively inspecting a hat stiffener. The system comprises a robotic arm. The system also comprises a probe that is fixed to the robotic arm. The probe comprises a body, which comprises an inspection surface and a slot formed in the inspection surface. The probe also comprises an ultrasonic-sensor assembly that is fixed to the body and open to the inspection surface via the slot. The probe further comprises a surface-engagement assembly that comprises a first foot and a second foot. The surface-engagement assembly is movably coupled to the body such that the first foot and the second foot are on opposite ends of the slot of the body and the first foot and the second foot are movable relative to the body and the ultrasonic-sensor assembly. The robotic arm is configured to autonomously move the probe along the hat stiffener such that at least a portion of the inspection surface of the body contacts the hat stiffener and the first foot and the second foot contact the hat stiffener. The preceding subject matter of this paragraph characterizes example 13 of the present disclosure.

The hat stiffener comprises a cap portion having a first radius. The first foot and the second foot are in first positions relative to the body and the ultrasonic-sensor assembly when in contact with the hat stiffener. The robotic arm is configured to autonomously remove the probe from the hat stiffener and autonomously move the probe along a second hat stiffener, having a second radius that is different than the first radius, such that at least a portion of the inspection surface of the body contacts the second hat stiffener and the first foot and the second foot contact the second hat stiffener. The first foot and the second foot are in second positions relative to the body and the ultrasonic-sensor assembly when in contact with the second hat stiffener. The first positions are different than the second positions. The preceding subject matter of this paragraph characterizes example 13 of the present disclosure, wherein example 13 also includes the subject matter according to example 14, above.

Additionally disclosed herein is a method of non-destructively inspecting a hat stiffener. The method comprises the step of contacting a cap portion of the hat stiffener with an inspection surface of a body of a probe. The method also includes the step of moving a first foot of the probe, relative to the body, to contact a first web portion of the hat stiffener when the inspection surface is contacting the cap portion of the hat stiffener. The method additionally includes the step of moving a second foot of the probe, relative to the body, to contact a second web portion of the hat stiffener when the inspection surface is contacting the cap portion of the hat stiffener. The method further includes the step of ultrasonically inspecting the cap portion of the hat stiffener with an ultrasonic-sensor assembly, fixed to the body and open to the inspection surface via a slot formed in the inspection surface of the body. The preceding subject matter of this paragraph characterizes example 15 of the present disclosure.

The method further comprises the step of filling a fluid chamber of the probe with a fluid, the fluid chamber being open to the ultrasonic-sensor assembly and defined at least partially between the inspection surface of the body, a first groove formed in the first foot, and a second groove formed in the second foot. The method also comprises the step of changing a volume of the fluid chamber by moving the first foot relative to the body and moving the second foot relative to the body. The preceding subject matter of this paragraph characterizes example 16 of the present disclosure, wherein example 16 also includes the subject matter according to example 15, above.

The method further comprises the steps of biasing the first foot away from the inspection surface and toward the second foot and biasing the second foot away from the inspection surface and toward the first foot. The preceding subject matter of this paragraph characterizes example 17 of the present disclosure, wherein example 17 also includes the subject matter according to any one of examples 15-16, above.

The first foot and the second foot are in first positions, relative to the body when in contact with the first web portion and the second web portion, respectively, of the hat stiffener and when the inspection surface of the body is in contact with the cap portion of the hat stiffener. The method further comprises the step of removing the probe from the hat stiffener. The method also comprises the step of contacting a cap portion of a second hat stiffener with the inspection surface of the body of the probe. An amount of the inspection surface in contact with the cap portion of the second hat stiffener is different than the amount of the inspection surface in contact with the cap portion of the first hat stiffener. The method additionally comprises the step of moving the first foot of the probe, relative to the body, into a second position to contact a first web portion of the second hat stiffener when the inspection surface is contacting the cap portion of the second hat stiffener. The method further comprises the step of moving the second foot of the probe, relative to the body, into a second position to contact a second web portion of the second hat stiffener when the inspection surface is contacting the cap portion of the second hat stiffener. The method also comprises the step of ultrasonically inspecting the cap portion of the second hat stiffener with the ultrasonic-sensor assembly. The first positions are different than the second positions. The preceding subject matter of this paragraph characterizes example 18 of the present disclosure, wherein example 18 also includes the subject matter according to any one of examples 15-17, above.

The steps of moving the first foot of the probe into the second position and moving the second foot of the probe into the second position comprises co-moving the first foot and the second foot into the second positions. The preceding subject matter of this paragraph characterizes example 19 of the present disclosure, wherein example 19 also includes the subject matter according to example 18, above.

The first foot of the probe is moved, relative to the body, along a first path. The second foot of the probe is moved, relative to the body, along a second path. An angle defined between the first path and the second path is perpendicular or oblique. The preceding subject matter of this paragraph characterizes example 20 of the present disclosure, wherein example 20 also includes the subject matter according to any one of examples 15-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which:

FIG. 9 is a schematic flow diagram of a method of non-destructively inspecting a hat stiffener, according to one or more examples of the present disclosure.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is probe for non-destructively inspecting a hat stiffener. According to some examples, as shown, the hat stiffener is a rounded hat stiffener. The probe includes movable feet that engage the hat stiffener to help contain fluid within a fluid chamber of the probe as the probe inspects the hat stiffener. The feet are configured to movably conform to hat stiffeners of varying shapes and sizes. Accordingly, the same probe can be used to inspect multiple differently-configured hat stiffeners, which saves time and costs over prior art techniques requiring the swapping out of multiple differently-configured probes in order to inspect multiple hat stiffeners of different configurations. Additionally, the feet of the probe of the present disclosure cooperate with each other to facilitate self-centering of the probe on the hat stiffener.

Figure 1:
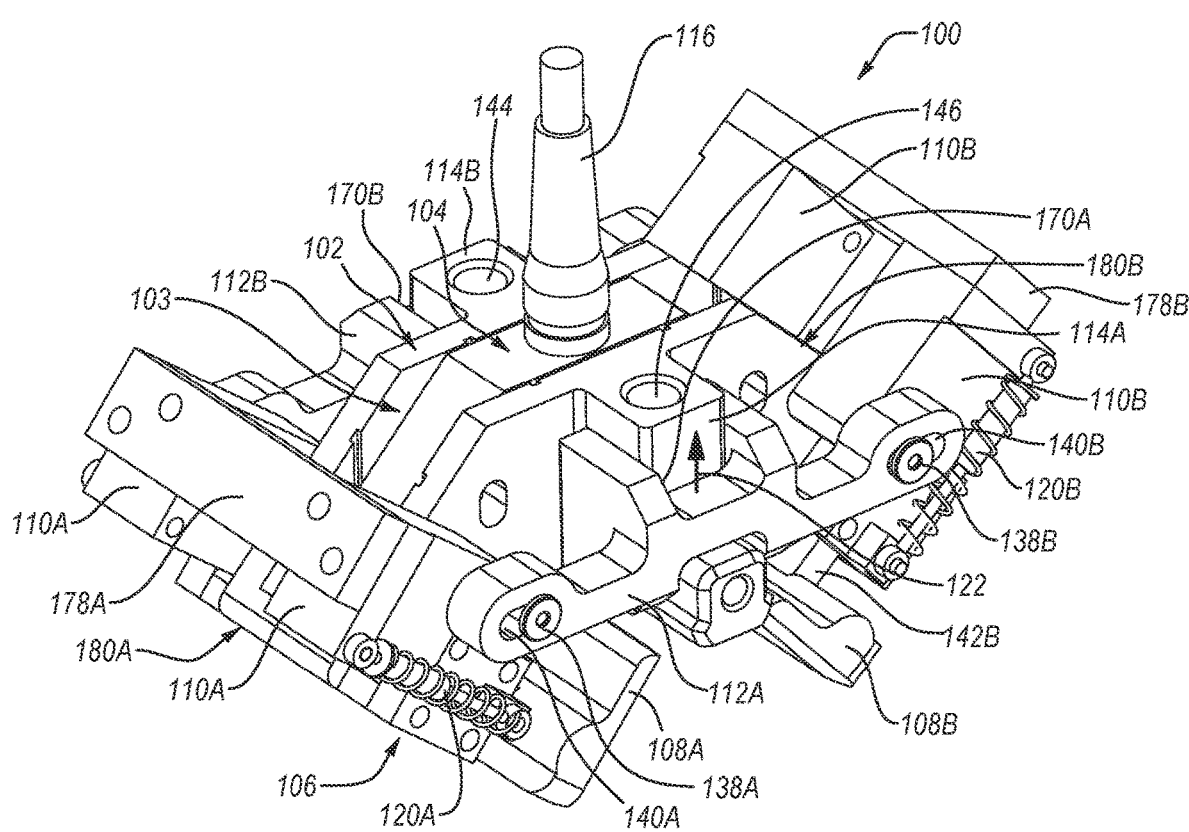
FIG. 1 is a schematic, perspective view of a probe for non-destructively inspecting a hat stiffener, according to one or more examples of the present disclosure.

Referring to FIG. 1, according to some examples, a probe 100 for non-destructively inspecting hat stiffeners is shown. The probe 100 includes a body 102 and an ultrasonic-sensor assembly 104 fixed to the body 102. In certain examples, the ultrasonic-sensor assembly 104 is non-movably fixed to the body 102. Accordingly, in such examples, the ultrasonic-sensor assembly 104 does not move relative to the body 102. As shown in FIG. 1, the body 102 can include an interior cavity 103 in which the ultrasonic-sensor assembly 104 is positioned when fixed to the body 102. Although not specifically shown, the ultrasonic-sensor assembly 104 includes an ultrasonic sensor and a housing that houses the ultrasonic sensor. The ultrasonic sensor is an ultrasonic sensor array, such as an ultrasonic linear phased array. For example, the ultrasonic sensor can include multiple ultrasonic transceivers that are configured to asynchronously generate ultrasonic signals, which combine to form a beam of sound directed into the hat stiffener under inspection. The ultrasonic transceivers are also configured to receive and detect soundwaves from the hat stiffener under inspection. The soundwaves from the hat stiffener are reflected portions of the beam of sound directed into the hat stiffener. Based on the characteristics of the reflected portions of the beam of sound from the hat stiffener, abnormalities in the hat stiffener can be detected. The ultrasonic-sensor assembly 104 includes an electrical coupler 116 with one or more wires for facilitating the transmission of power to the ultrasonic-sensor assembly 104 and data to and from the ultrasonic-sensor assembly 104.

Figure 2:
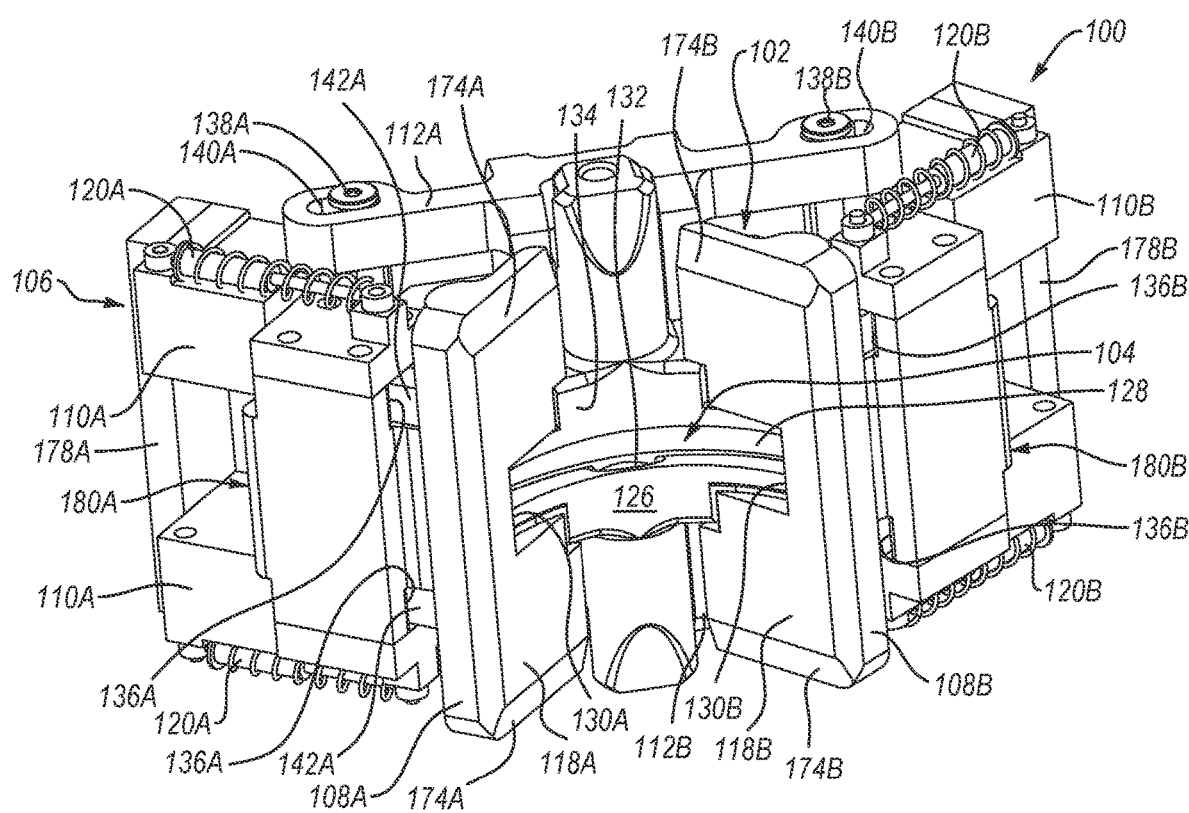
FIG. 2 is a schematic, perspective view of the probe of FIG. 1, according to one or more examples of the present disclosure.
Figure 5:
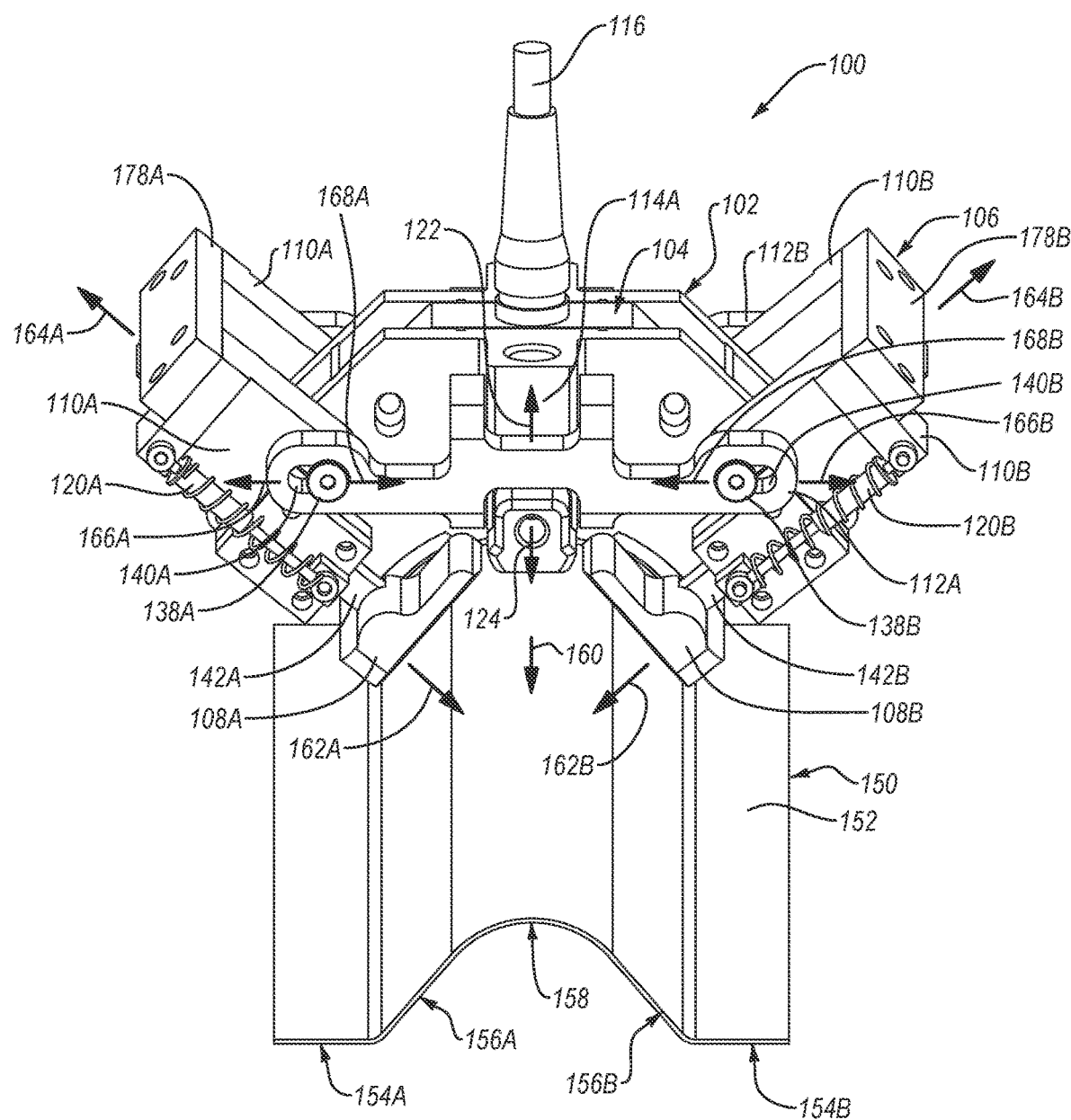
FIG. 5 is a schematic, perspective view of the probe of FIG. 1, shown inspecting a hat stiffener, according to one or more examples of the present disclosure.

As shown in FIG. 2, the body 102 includes an inspection surface 134 and a slot 128 formed in the inspection surface 134. The inspection surface 134 is configured to contact an outer surface 152 of a hat stiffener 150 (e.g., stringer) while the ultrasonic-sensor assembly 104 directs soundwaves to and receives soundwaves from the hat stiffener 150. Referring to FIG. 5, the cap portion 158 joins together a first web portion 156A and a second web portion 156B of the hat stiffener 150. In other words, the cap portion 158 is between and separates the first web portion 156A from the second web portion 156B. The hat stiffener 150 further includes a first flange portion 154A directly coupled to the first web portion 156A and a second flange portion 154B directly coupled to the second web portion 156B. The first flange portion 154A and the second flange portion 154B are configured to interface with another part or component such that the hat stiffener 150 helps to stiffen the part or component. In some examples, except for a radiused section between corresponding web and flange portions, the first web portion 156A, the second web portion 156B, the first flange portion 154A, and the second flange portion 154B are planar. The cap portion 158 is contoured or curved in elevation view, such that in elevation view the cap portion 158, the first web portion 156A, and the second web portion 156B define a shape having two substantially linear portions connected by an arcuate portion, where the linear portions are angled relative to each other. The curvature of the outer surface 152 of the cap portion 158 has a radius. For example, in FIG. 7, the outer surface 152 of the cap portion 158 of the hat stiffener 150 has a radius r1. In contrast, in FIG. 8, the outer surface 152 of the cap portion 158 of the hat stiffener 150 has a radius r2. In the illustrated examples, the radius r1 is greater than the radius r2.

Figure 7:
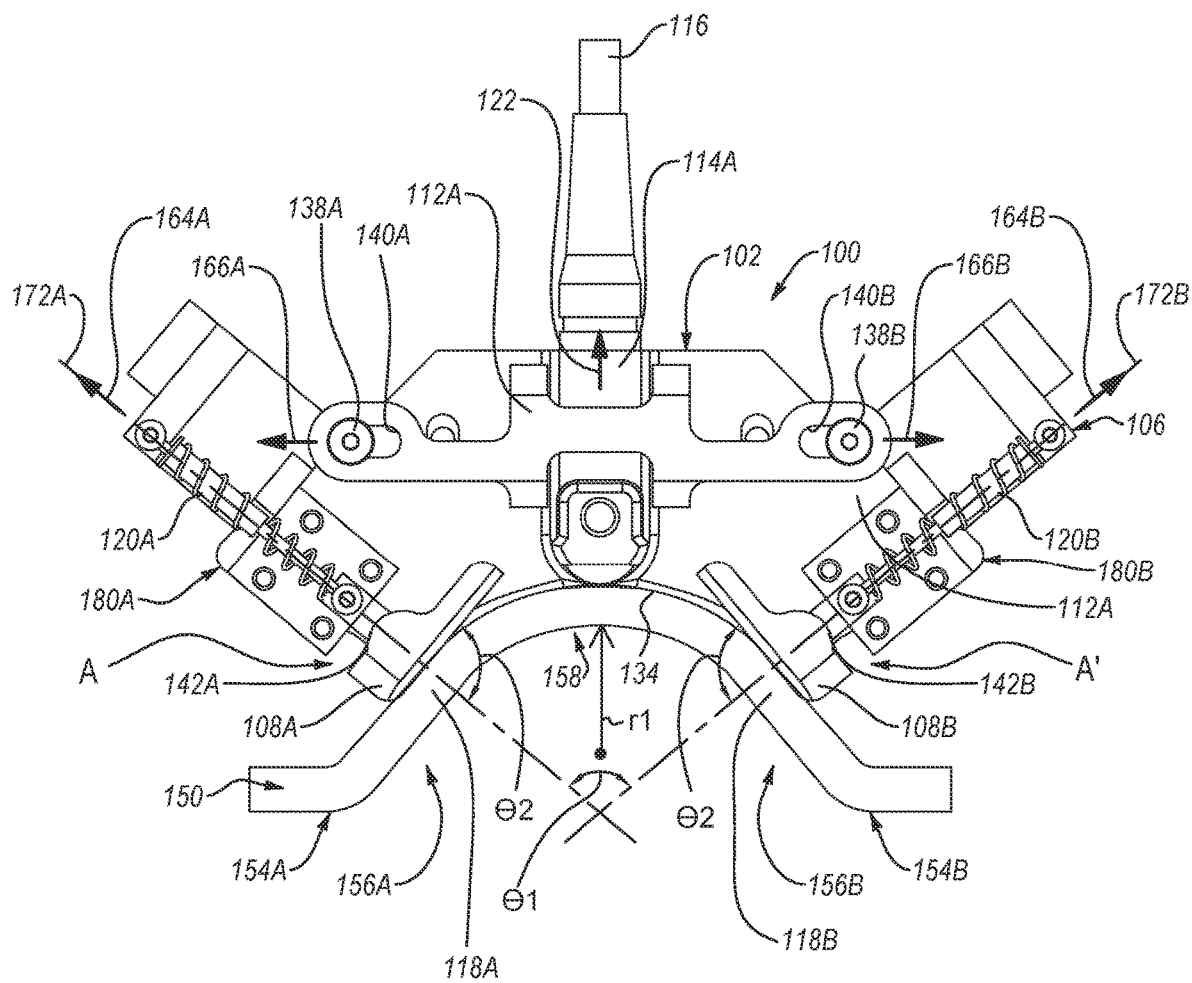
FIG. 7 is a schematic, front elevation view of the probe of FIG. 1, shown inspecting a hat stiffener having a first radius, according to one or more examples of the present disclosure.
Figure 8:
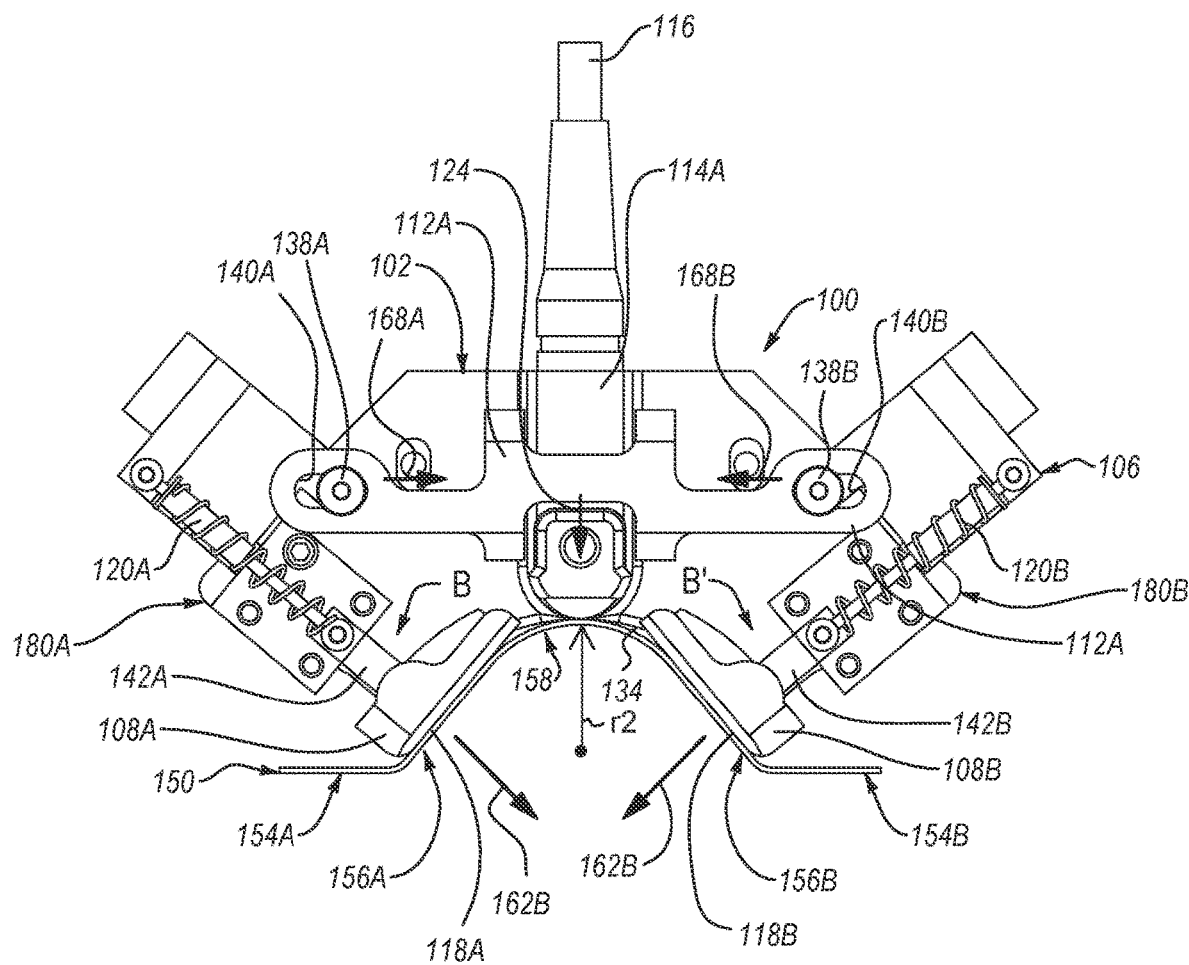
FIG. 8 is a schematic, front elevation view of the probe of FIG. 1, shown inspecting a hat stiffener having a second radius, according to one or more examples of the present disclosure.

In some examples, the inspection surface 134 has a shape that complements the shape of the outer surface 152 of the hat stiffener 150. Generally, the probe 100 is used to non-destructively inspect a cap portion 158 of the hat stiffener 150, which in the illustrated examples is a round cap portion. Accordingly, the inspection surface 134 is shaped to complement the shape of the outer surface 152 of the cap portion 158 of the hat stiffener 150 in some examples. As shown in FIG. 2, the inspection surface 134 has a contoured shape that generally complements the contoured shape of the cap portion 158 of the hat stiffener 150. The shape of the inspection surface 134 is fixed. Therefore, more or less of the inspection surface 134 contacts the outer surface 152 of the cap portion 158 during inspection depending on the radius of the cap portion 158. Accordingly, the amount of the inspection surface 134 that contacts the cap portion 158 during inspection may vary depending on the radius of the cap portion 158. For instance, FIGS. 7 and 8 illustrate different amounts of the inspection surface 134 contacting the cap portion 158. In some examples, the ultrasonic sensor array of the ultrasonic-sensor assembly 104 is also shaped to complement the shape of the outer surface 152 of the cap portion 158 of the hat stiffener 150. Such a configuration enables the ultrasonic transceivers of the ultrasonic sensor array to generate ultrasonic signals that are substantially perpendicular to the outer surface 152 of the cap portion 158 of the hat stiffener 150 where the ultrasonic signals impact the outer surface 152 of the cap portion 158. Moreover, for inspecting cap portions 158 of different hat stiffeners 150 that have different radii, perpendicularity of the ultrasonic signals can be achieved using an ultrasonic linear phased array. A ultrasonic linear phased array can phase shift the generation of the ultrasonic signals from each transceiver of the array to change the directionality of the resultant ultrasonic beam to conform to the different radii of the cap portions 158 and maintain perpendicularity of the resultant ultrasonic beam with the cap portions 158.

As shown in FIG. 2, the slot 128 formed in the inspection surface 134 extends from the inspection surface 134 to the ultrasonic-sensor assembly 104. Accordingly, the ultrasonic-sensor assembly 104 is open to the inspection surface 134 via the slot 128. In this manner, access to the ultrasonic-sensor assembly 104 through the inspection surface 134 is unobstructed, which allows ultrasonic signals to transmit to the outer surface 152 of the hat stiffener 150 from the ultrasonic-sensor assembly 104 and to transmit from the outer surface 152 of the hat stiffener 150 to the ultrasonic-sensor assembly 104 without obstruction. As described below, the slot 128 forms part of a fluid chamber 126 that receives fluid, such as water, which acts as an ultrasonic coupling medium to help maintain ultrasonic coupling (i.e., "water coupling") between the ultrasonic sensor array of the ultrasonic-sensor assembly 104 and the outer surface 152 of the hat stiffener 150. The inspection surface 134 also forms part of the fluid chamber 126.

The ultrasonic sensor array and the slot 128 are elongated in a lateral direction that is perpendicular to an inspection direction 160 of the probe 100 (see, e.g., FIG. 5). Moreover, the cap portion 158 of the hat stiffener 150, the inspection surface 134, the slot 128, and the ultrasonic sensor array are curved about an axis parallel with the inspection direction 160 (e.g., curved across the width of the hat stiffener 150). Accordingly, the slot 128 extends lengthwise circumferentially along the inspection surface 134.

As shown in FIG. 1, the probe 100 additionally includes a surface-engagement assembly 106 that is movably coupled to the body 102 such that the surface-engagement assembly 106 is movable relative to the body 102. The surface-engagement assembly 106 includes a first foot 108A and a second foot 108B. The first foot 108A is movably coupled to the body 102 on a first lateral side 180A of the body 102 and the second foot 108B is movably coupled to the body 102 on a second lateral side 180B of the body 102 such that, for example, the slot 128 extends lengthwise from proximate the first foot 108A to proximate the second foot 108B. Accordingly, the first lateral side 180A and the second lateral side 180B of the body 102 are spaced apart from each other by the slot 128 and the first foot 108A and the second foot 108B are on opposite ends of the slot 128. In others, the first foot 108A and the second foot 108B, in effect, straddle the slot 128 in an end-to-end manner. Because the surface-engagement assembly 106 is movable relative to the body 102, the first foot 108A and the second foot 108B of the surface-engagement assembly 106 also are movable relative to the body 102, as well as the ultrasonic-sensor assembly 104 fixed to the body 102. As explained in more detail below, the first foot 108A and the second foot 108B, being movable relative to the body 102 and the ultrasonic-sensor assembly 104, enable the probe 100 to accommodate differently sized (e.g., radiused) hat stiffeners.

The surface-engagement assembly 106 also includes first legs 110A and second legs 110B that are movable relative to the body 102 and the ultrasonic-sensor assembly 104. The first foot 108A is fixed to inward ends of the first legs 110A and the second foot 108B is fixed to inward ends of the second legs 110B. The first legs 110A are spaced apart from each other, which enables the body 102 to be interposed between the first legs 110A. Correspondingly, the second legs 110B are spaced apart from each other, which enables the body 102 to be interposed between the second legs 110B. In this manner, the first legs 110A and the second legs 110B straddle the body 102 while being movable relative to the body 102.

Outward ends of the first legs 110A are coupled together, such as by a first bridge 178A, and outward ends of the second legs 110B are coupled together, such as by a second bridge 178B. The first bridge 178A and the second bridge 178B promote stability and co-movability between the first legs 110A and the second legs 110B, respectively. The first bridge 178 and the first legs 110A can be separately formed and attached together or co-formed as a one-piece monolithic construction. Similarly, the first foot 108A can be separately formed from and attached to the first legs 110A or co-formed as a one-piece monolithic construction with the first legs 110A. Likewise, the second foot 108B can be separately formed from and attached to the second legs 110B or co-formed as a one-piece monolithic construction with the second legs 110B.

Referring to FIG. 2, the first legs 110A includes first retention portions 142A between the inward and outward ends of the first legs 110A. Similarly, the second legs 110B includes second retention portions 142B between the inward and outward ends of the second legs 110B. Moreover, the body 102 includes first retaining channels 136A and second retaining channels 136B. The first retaining channels 136A are spaced apart from each other on the first lateral side 180A of the body 102 and the second retaining channels 136B are spaced apart from each other on the second lateral side 180B of the body 102. Each one of the first retaining channels 136A and the second retaining channels 136B define a circumferentially closed channel through which a corresponding one of the first retention portions 142A and the second retention portions 142B extends. The first retaining channels 136A and the second retaining channels 136B movably (e.g., slidably) retain a corresponding one of the first retention portions 142A and the second retention portions 142B extends. In other words, the first retention portions 142A and the second retention portions 142B move along the first retaining channels 136A and the second retaining channels 136B, respectively, in directions defined by the orientation of the first retaining channels 136A and the second retaining channels 136B. As shown in FIG. 5, the first retaining channels 136A are oriented parallel to a first extension direction 162A and a first retraction direction 164A and the second retaining channels 136B are oriented parallel to a second extension direction 162B and a second retraction direction 164B.

As the first retention portions 142A and the second retention portions 142B move along the first retaining channels 136A and the second retaining channels 136B, the first foot 108A and the second foot 108B correspondingly move. Accordingly, the orientation of the first retaining channels 136A corresponds with the directionality of the movement of the first foot 108A and the orientation of the second retaining channels 136B corresponds with the directionality of the movement of the second foot 108B. Moreover, because the first retaining channels 136A and the second retaining channels 136B are linear, the first foot 108A and the second foot 108B are slidable relative to the body 102 along linear paths.

In certain examples, the first retaining channels 136A and the second retaining channels 136B each have a two-piece construction. For example, a corresponding one of the first retention portions 142A and the second retention portions 142B can be positioned into an open portion of one of the first retaining channels 136A and the second retaining channels 136B, which is then closed by a second portion, attached to the open portion, to circumferentially close the corresponding retention channel and movably retain the retention portion therein.

Figure 3:
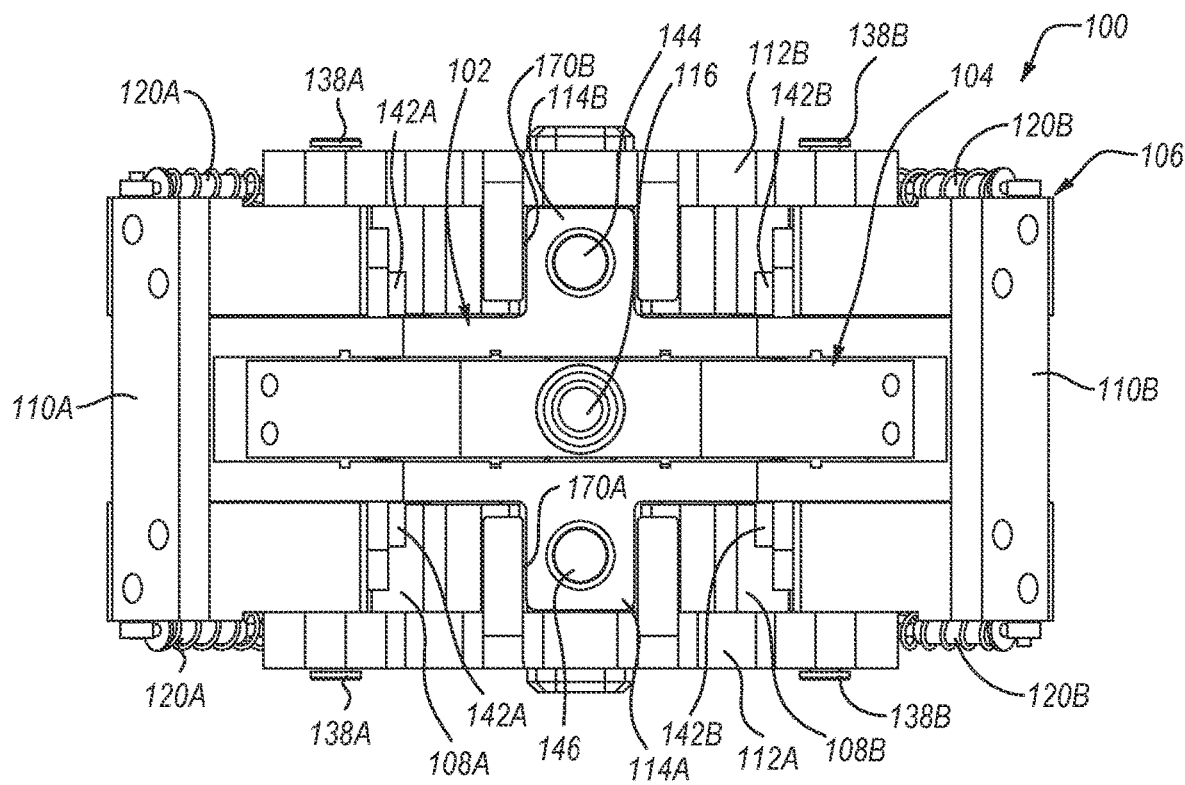
FIG. 3 is a schematic, top plan view of the probe of FIG. 1, according to one or more examples of the present disclosure.

In some examples, the first legs 110A and the second legs 110B are co-movable relative to each other. Accordingly, in such examples, the first foot 108A and the second foot 108B are co-movable relative to each other. The surface-engagement assembly 106 includes a crossbar 112A and a second crossbar 112B that facilitate co-movement of the first foot 108A and the second foot 108B, in certain examples. The crossbar 112A and the second crossbar 112B are on opposite sides of the body such that the ultrasonic-sensor assembly 104 is interposed between the crossbar 112A and the second crossbar 112B (see, e.g., FIG. 3). The crossbar 112A and the second crossbar 112B span laterally across the body 102 from the first lateral side 180A of the body 102 to the second lateral side 180B of the body 102. The crossbar 112A and the second crossbar 112B intercouple the first foot 108A and the second foot 108B such that translational movement of the crossbar 112A and the second crossbar 112B results in co-movement of the first foot 108A and the second foot 108B.

Each one of the crossbar 112A and the second crossbar 112B includes a first channel 140A and a second channel 140B on opposite end portions of the respective one of the crossbar 112A and the second crossbar 112B. The first channel 140A is configured to receive and retain a corresponding one of first pins 138A of the first legs 110A. Similarly, the second channel 140B is configured to receive and retain a corresponding one of second pins 138B of the second legs 110B. The first pins 138A are non-movably fixed to corresponding ones of the first legs 110A and the second pins 138B are non-movably fixed to corresponding ones of the second legs 110B. In some examples, the first pins 138A and the second pins 138B are fasteners affixed to and extending from corresponding ones of the legs.

The first channel 140A and the second channel 140B are elongated such that the first pin 138A and the second pin 138B are configured to move along the first channel 140A and the second channel 140B, respectively. The first pin 138A moves along the first channel 140A in a first outward direction 166A and a first inward direction 168A that is opposite the first outward direction 166A. The second pin 138B moves along the second channel 140B in a second outward direction 166B and a second inward direction 168B that is opposite the second outward direction 166B. Moreover, the first channel 140A and the second channel 140B are sized to constrain or limit movement of the respective first pin 138A and the second pin 138B to lengthwise along the corresponding first channel 140A and the second channel 140B. Accordingly, as an example, the pins can slide side-to-side, lengthwise, along the channel, but not up-and-down widthwise along the channel.

The crossbar 112A and the second crossbar 112B are movably coupled to the body 102 such that movement of the crossbar 112A and the second crossbar 112B, relative to the body 102, is limited to a first direction 122 and a second direction 124. The first direction 122 is opposite the second direction 124. Additionally, the first direction 122 and the second direction 124 are perpendicular to the lengthwise movement of the first pins 138A and the second pins 138B along the first channels 140A and the second channels 140B of the crossbar 112A and the second crossbar 112B.

Corresponding movement of the crossbar 112A and the second crossbar 112B is limited to the first direction 122 and the second direction 124 via slidable engagement between a guiderail slot 170A of the crossbar 112A and a guiderail 114A of the body 102, on one side of the body, and slidable engagement between a second guiderail slot 170B of the second crossbar 112B and a second guiderail 114B of the body 102. Accordingly, the guiderail slot 170A is slidably engaged with the guiderail 114A such that the guiderail 114A limits movement of the crossbar 112A to the first direction 122 and the second direction 124 and the second guiderail slot 170B is slidably engaged with the second guiderail 114B such that the second guiderail 114B limits movement of the second crossbar 112B to the first direction 122 and the second direction 124. The guiderail 114A and the second guiderail 114B extend lengthwise in the first direction 122 and the second direction 124. Moreover, the guiderail 114A and the second guiderail 114B are nestably received in a respective one of the guiderail slot 170A and the second guiderail slot 170B.

Referring to FIGS. 1 and 2, the probe 100 further includes first biasing mechanisms 120A and second biasing mechanisms 120B. The first biasing mechanisms 120A are coupled to the first lateral side 180A of the body 102, at first ends of the first biasing mechanisms 120A and the surface-engagement assembly 106 at second ends of the first biasing mechanisms 120A. The second biasing mechanisms 120B are coupled to the second lateral side 180B of the body 102, at first ends of the second biasing mechanisms 120B, and the surface-engagement assembly 106, at second ends of the second biasing mechanisms 120B. More specifically, the second ends of the first biasing mechanisms 120A are coupled to respective ones of the first legs 110A and the second ends of the second biasing mechanisms 120B are coupled to respective ones of the second legs 110B. The first biasing mechanisms 120A, being coupled to and extending between the body 102 and the first legs 110A, are configured to bias the first foot 108A away from a retracted position (see, e.g., FIG. 7) and into an extended position (see, e.g., FIG. 8). Similarly, the second biasing mechanisms 120B, being coupled to and extending between the body 102 and the second legs 110B, are configured to bias the second foot 108B away from the retracted position and into the extended position.

According to one example, each one of the first biasing mechanisms 120A and the second biasing mechanisms 120B is a spring, such as a compression spring. In the case of a compression spring, when coupled to the outward ends of the legs, the springs are at least partially or not in tension when the first foot 108A and the second foot 108B are in the extended position. However, any movement of the first foot 108A and the second foot 108B toward the retracted position causes the compression springs to be placed in tension and thus apply a biasing force that urges the first foot 108A and the second foot 108B toward the extended direction. Alternatively, when the compression springs are coupled to the inward ends of the legs (e.g., proximate the feet), the springs are at least partially or not in compression when the first foot 108A and the second foot 108B are in the extended position. However, any movement of the first foot 108A and the second foot 108B toward the retracted position causes the compression spring to be compressed and thus apply a biasing force that urges the first foot 108A and the second foot 108B toward the extended direction. The compression springs may include other damping mechanisms or materials, such as damping fluids that control the damping characteristics of the compression springs. In some examples, the first biasing mechanisms 120A and the second biasing mechanisms 120B are passive. However, in other examples, the first biasing mechanisms 120A and the second biasing mechanisms 120B can be actively controlled.

As shown in FIG. 2, the first foot 108A includes a first engagement surface 118A and the second foot 108B includes a second engagement surface 118B. The first engagement surface 118A is configured to engage the outer surface 152 of the first web portion 156A of the hat stiffener 150. Similarly, the second engagement surface 118B is configured to engage the outer surface 152 of the second web portion 156B of the hat stiffener 150. Generally, the first engagement surface 118A and the second engagement surface 118B are shaped to complement the shape of the first web portion 156A and the second web portion 156B. For example, the first engagement surface 118A and the second engagement surface 118B can be shaped such that maximized portions of the first engagement surface 118A and the second engagement surface 118B sit flush against the first web portion 156A and the second web portion 156B, respectively. Accordingly, in one example where the first web portion 156A and the second web portion 156B are planar, the first engagement surface 118A and the second engagement surface 118B are planar to sit flush against the first web portion 156A and the second web portion 156B. In other examples, the first engagement surface 118A and the second engagement surface 118B are contoured to complement a contour of the first web portion 156A and the second web portion 156B.

Referring to FIGS. 5 and 7, translational movement of the crossbar 112A and the second crossbar 112B in the first direction 122 away from the inspection surface 134 corresponds with movement of the first foot 108A in the first retraction direction 164A toward its retracted position (e.g., a first retracted position A) and movement of the second foot 108B in the second retraction direction 164B toward its retracted position (e.g., a second retracted position A'). In contrast, referring to FIGS. 5 and 8 translational movement of the crossbar 112A and the second crossbar 112B in the second direction 124 toward the inspection surface 134 corresponds with movement of the first foot 108A in the first extension direction 162A toward its extended position (e.g., a first extended position B) and movement of the second foot 108B in the second extension direction 162B toward its extended position (e.g., a second extended position B'). Movement of the first foot 108A between the first retracted position and the first extended position is along a first path 172A relative to the body 102 (see, e.g., FIG. 7). Similarly, movement of the second foot 108B between the second retracted position and the second extended position is along a second path 172B relative to the body 102.

The first path 172A and the second path 172B are linear in some examples. Moreover, in certain examples, a first angle θ1 defined between the first path 172A and the second path 172B is perpendicular or oblique (i.e., non-parallel). Accordingly, as the first foot 108A and the second foot 108B move along the first path 172A and the second path 172B in the first extension direction 162A and the second extension direction 162B, the first foot 108A and the second foot 108B move toward each other. In contrast, as the first foot 108A and the second foot 108B move along the first path 172A and the second path 172B in the first retraction direction 164A and the second retraction direction 164B, the first foot 108A and the second foot 108B move away from each other. Also, in some examples, the first foot 108A is further from the inspection surface 134 in the first extended position than in the first retracted position and the second foot 108B is further from the inspection surface 134 in the second extended position than in the second retracted position. Such a configuration accommodates different radiuses of different hat stiffeners.

Referring to FIG. 7, in some examples, the first foot 108A is fixed to the inward end of the first leg 110A such that the first engagement surface 118A is at a second angle θ2 relative to the first path 172A. Likewise, in some examples, the second foot 108B is fixed to the inward end of the second leg 110B such that the second engagement surface 118B is at a second-prime angle θ2' relative to the second path 172B. The second angle θ2 is 90-degrees and the second-prime angle θ2' is 90-degrees in some examples. Angling the first engagement surface 118A and the second engagement surface 118B in this manner, helps to ensure an adequate portion of the first engagement surface 118A and the second engagement surface 118B contacts the first web portion 156A and the second web portion 156B of variously sized hat stiffeners.

Figure 4:
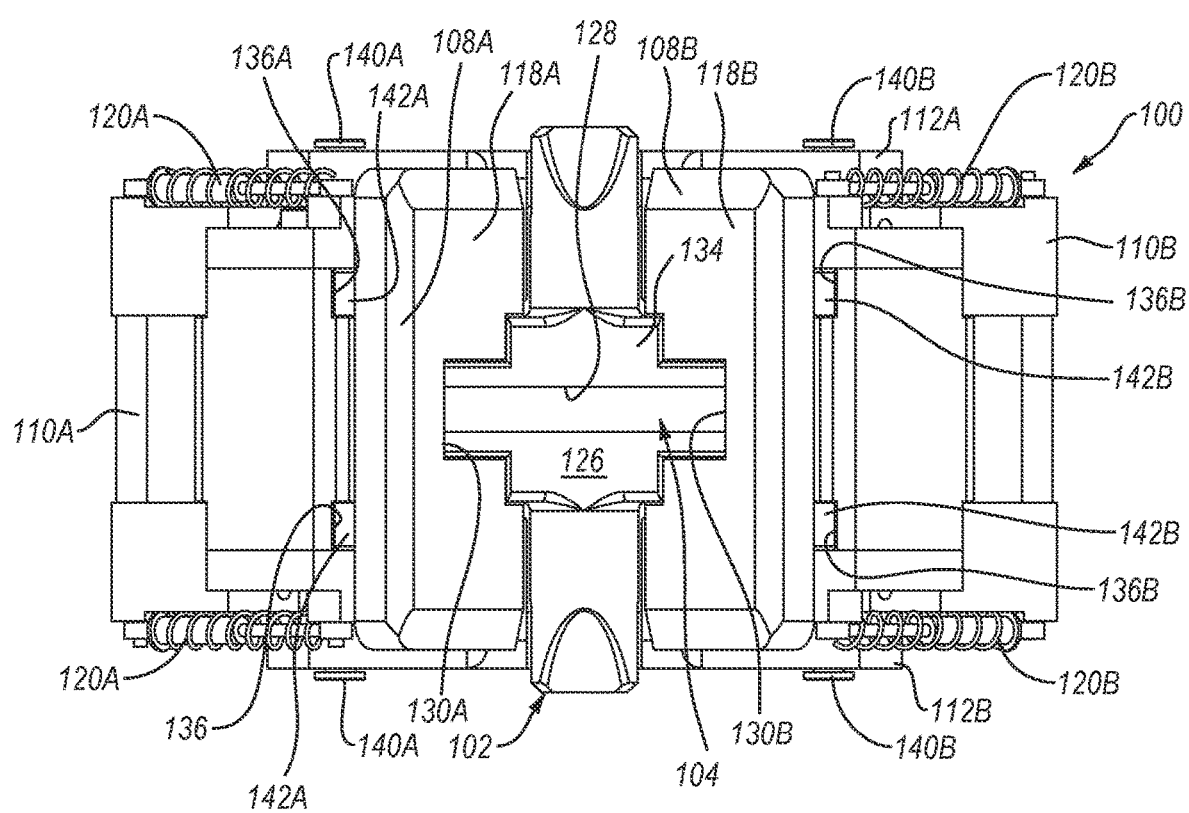
FIG. 4 is a schematic, bottom plan view of the probe of FIG. 1, according to one or more examples of the present disclosure.

To accommodate the slot 128, limit obstruction of the sound waves generated by the ultrasonic-sensor assembly 104 through the slot 128, and help define a fluid chamber 126, the first foot 108A and the second foot 108B include a first groove 130A and a second groove 130B, respectively, formed in the respective first engagement surface 118A and the second engagement surface 118B. The first groove 130A or notch effectively wraps around an end of the slot 128 and the second groove 130B or notch effectively wraps around an opposite end of the slot 128. The first groove 130A and the second groove 130B enable the first engagement surface 118A and the second engagement surface 118B to extend from one side of the slot 128 to an opposite side of the slot 128. As shown in FIG. 4, in plan view, the slot 128 and the ultrasonic-sensor assembly 104 extend lengthwise between the first groove 130A and the second groove 130B.

As shown in FIG. 2, the first foot 108A includes first beveled edges 174A and the second foot 108B includes second beveled edges 174B. Depending on an inspection direction 160 (see, e.g., FIG. 5), each one of the first beveled edges 174A is a corresponding one of a first beveled leading edge or a first beveled trailing edge. As shown, the first beveled leading edge and the first beveled trailing edge (i.e., the first beveled edges 174A) oppose each other or are on opposite ends of the first foot 108A. Similarly, depending on the direction of inspection, each one of the second beveled edges 174B is a corresponding one of a second beveled leading edge or a second beveled trailing edge. As shown, the second beveled leading edge and the second beveled trailing edge (i.e., the second beveled edges 174B) oppose each other or are on opposite ends of the second foot 108B. The first beveled edges 174A and the second beveled edges 174B are parallel to the lengthwise direction of the slot 128 or perpendicular to the inspection direction 160. As used herein, the term perpendicular can mean exactly perpendicular (i.e., forming a 90-degree angle) or substantially perpendicular (i.e., within +/−5-degrees of forming a 90-degree angle).

Referring to FIG. 2, at least a portion of the first engagement surface 118A and the second engagement surface 118B, on both sides of the first groove 130A and the second groove 130B, is co-extensive with (e.g., immediately adjacent) a portion of the inspection surface 134 of the body 102. As the first foot 108A and the second foot 108B move between the extended and retracted positions, the portions of the first engagement surface 118A and the second engagement surface 118B that are co-extensive with the inspection surface 134 changes. However, because as least some portion of the first engagement surface 118A and the second engagement surface 118B remains co-extensive with the inspection surface 134 on both sides of the grooves, a substantially continuous fluid boundary is defined along the first engagement surface 118A, the second engagement surface 118B, and the inspection surface 134 on both sides of the slot 128.

The continuous fluid boundary along the first engagement surface 118A, the second engagement surface 118B, and the inspection surface 134 defines a portion of the fluid chamber 126. The fluid chamber 126 is open to the ultrasonic-sensor assembly 104 and includes the space defined by the slot 128. Accordingly, the fluid chamber 126 of the probe 100 is the space or volume defined between the ultrasonic-sensor assembly 104, the slot 128, the inspection surface 134, the first groove 130A, and the second groove 130B. Thus, as the first foot 108A and the second foot 108B move between the extended and retracted positions, the volume of the fluid chamber 126 changes.

Referring to FIG. 1, in some examples, the body 102 of the probe 100 additionally includes a first fluid input 144 and a second fluid input 146 both open to the slot 128. The first fluid input 144 is fluidically coupled to a fluid source and receives fluid from the fluid source. The second fluid input 146 is also fluidically coupled to a fluid source, which can be the same fluid source that is fluidically coupled to the first fluid input 144, to receive fluid from the fluid source. During non-destructive inspection of the hat stiffener 150 with the probe 100, fluid, from the fluid source, is transferred from the first fluid input 144 and the second fluid input 146 into the fluid chamber 126. In this manner, fluid is circulated through the fluid chamber 126. The fluid in the fluid chamber 126 at any given time helps facilitate the transmission of sound waves from the ultrasonic-sensor assembly 104 to the outer surface 152 of the cap portion 158 of the hat stiffener 150. More specifically, the fluid chamber 126 serves to transmit sound from the ultrasonic sensor into the part and then back to the sensor. Maintaining fluid coupling between the part and sensor at all times during an inspection helps generate acceptable data. In some examples, the fluid is any fluid capable of providing a coupling medium through which sound waves travel more efficiently than air. In some examples, the fluid is water. In other examples, the fluid can be a gel or an oil.

Figure 6:
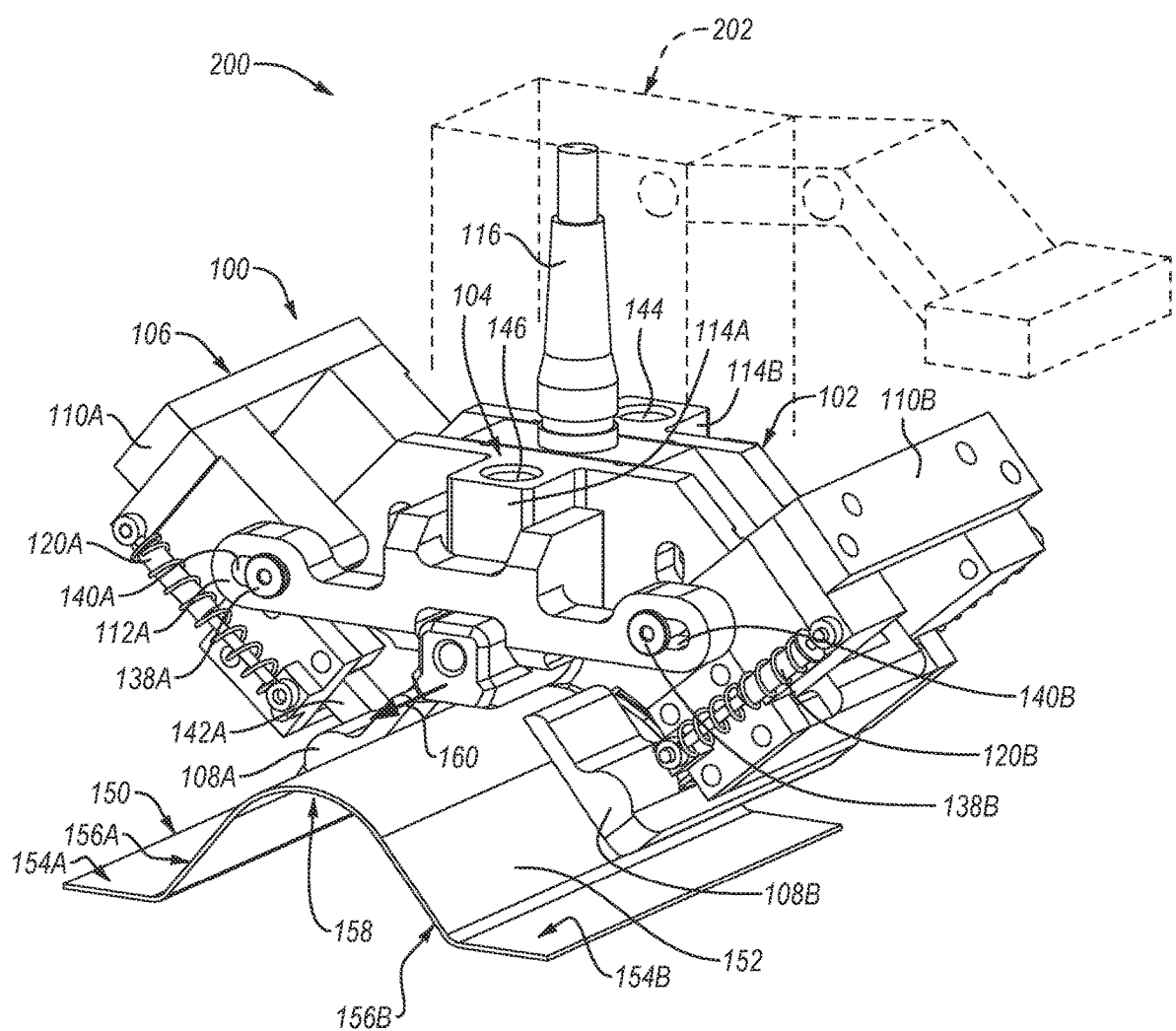
FIG. 6 is a schematic, perspective view of a system for non-destructively inspecting a hat stiffener, according to one or more examples of the present disclosure.

The probe 100 is manually or autonomously moved along the outer surface 152 of the hat stiffener 150 during a non-destructive inspection process. In some examples, the probe 100 is part of a handheld tool that a user grasps and manually moves long the hat stiffener 150. According to alternative examples, the probe 100 is part of an autonomously-driven tool that autonomously moves the probe 100 along the hat stiffener 150. Referring to FIG. 6, a system 200 for non-destructively inspecting the hat stiffener 150 includes a robotic arm 202. The probe 100 is fixed to the robotic arm 202. Generally, the robotic arm 202 is configured to autonomously move the probe 100 along the hat stiffener 150 such that at least a portion of the inspection surface 134 of the body 102 contacts the hat stiffener 150 and the first foot 108A and the second foot 108B, in first positions relative to the body 102 and the ultrasonic-sensor assembly 104, contact the hat stiffener 150.

According to some examples, the system 200 is configured to inspect hat stiffeners of various sizes. In one example, the robotic arm 202 is configured to autonomously remove the probe 100 from the hat stiffener 150, which can be considered a first hat stiffener with a first radius r1, and autonomously move the probe 100 along a second hat stiffener, having a second radius r2 that is different than the first radius r1, such that at least a portion of the inspection surface 134 of the body 102 contacts the second hat stiffener and the first foot 108A and the second foot 108B, in second positions relative to the body 102 and the ultrasonic-sensor assembly 104, contact the second hat stiffener 150. The first positions are different than the second positions. In an example, the hat stiffener 150 illustrated in FIG. 7 is the first hat stiffener, and the hat stiffener 150 illustrated in FIG. 8 is the second hat stiffener.

The robotic arm 202 can be any of various automated robots. In some examples, the robotic arm 202 includes a footing and multiple articulating members, such as a base that is rotatable relative to the footing about a vertical axis, a connecting arm that is pivotable relative to the base about a horizontal axis, a support arm that is pivotable relative to the connecting arm about a horizontal axis, an end-effector extension arm that is rotatable relative to the support arm about a support axis, an end-effector coupler arm that is pivotable relative to the end-effector extension arm, and an end-effector interface arm that is rotatable and to which the probe 100 is co-movably fixed. Accordingly, in some examples, the robotic arm 202 is a 6-axis robot that facilitates motion of the probe 100 with 6-degrees of freedom. However, in other examples, the robotic arm 202 can have fewer or more than 6-degrees of freedom.

Referring to FIG. 9, according to some examples, a method 300 of using the probe 100 to non-destructively inspect one or more hat stiffeners, such as the hat stiffener 150, is shown. The method 300 includes (block 302) contacting the cap portion 158 of the hat stiffener 150 with at least a first portion of the inspection surface 134 of the body 102 of the probe 100. The method 300 also includes (block 304) moving the first foot 108A of the probe 100, relative to the body 102, to contact the first web portion 156A of the hat stiffener 150 when the inspection surface 134 is contacting the cap portion 158 of the hat stiffener 150. The method 300 additionally includes (block 306) moving the second foot 108B of the probe 100, relative to the body 102, to contact a second web portion 156B of the hat stiffener 150 when the inspection surface 134 is contacting the cap portion 158 of the hat stiffener 150. In certain examples, the first foot 108A is moved along the first path 172A and the second foot 108B is moved along the second path 172B. The method 300 further includes (block 308) ultrasonically inspecting the cap portion 158 of the hat stiffener 150 with the ultrasonic-sensor assembly 104, which is fixed to the body 102 and open to the inspection surface 134 via the slot 128. In some examples, the cap portion 158 is ultrasonically inspected at block 308 while the probe 100 is moved along the hat stiffener 150.

In some examples, prior to ultrasonically inspecting the cap portion 158 at block 308, the method 300 also includes (block 310) filling the fluid chamber 126 of the probe 100 and (block 312) changing a volume of the fluid chamber 126 by moving the first foot 108A relative to the body 102 and moving the second foot 108B relative to the body 102.

The method 300 additionally includes (block 314) biasing the first foot 108A away from the inspection surface 134 and toward the second foot 108B and (block 316) biasing the second foot 108B away from the inspection surface 134 and toward the first foot 108A. Biasing the first foot 108A and the second foot 108B toward each other helps to ensure contact between the first foot 108A and the first web portion 156A and the second foot 108B and the second web portion 156B of hat stiffeners having cap portions 158 with different radiuses. In certain examples, the first foot 108A and the second foot 108B are co-movably coupled such that movement of one of the first foot 108A and the second foot 108B causes movement of the other of the first foot 108A and the second foot 108B. Co-movement and equal biasing of the first foot 108A and the second foot 108B facilities self-centering of the probe 100 on the hat stiffener 150.

In certain examples, the method 300 includes steps associated with inspecting two or more hat stiffeners with different radiuses. According to block 304 of the method 300, the first foot 108A and the second foot 108B can be in first positions, relative to the body 102, when in contact with the first web portion 156A and the second web portion 156B, respectively, of a first hat stiffener and when the inspection surface 134 of the body 102 is in contact with the cap portion 158 of the first hat stiffener. The method 300 can additionally include removing the probe 100 from the first hat stiffener and contacting the cap portion of a second hat stiffener with at least a second portion of the inspection surface 134 of the body 102 of the probe 100. The method 300 can further include moving the first foot 108A of the probe 100, relative to the body 102, into a second position to contact the first web portion of the second hat stiffener when the inspection surface 134 is contacting the cap portion of the second hat stiffener, moving the second foot 108B of the probe 100, relative to the body 102, into a second position to contact a second web portion of the second hat stiffener when the inspection surface 134 is contacting the cap portion of the second hat stiffener, and ultrasonically inspecting the cap portion of the second hat stiffener with the ultrasonic-sensor assembly 104. The radius of the cap portion of the first hat stiffener is different than the radius of the cap portion of the second hat stiffener, and the first positions are different than the second positions.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A probe for non-destructively inspecting a hat stiffener, the probe comprising:
    a body, comprising a stiffener-engagement surface and a slot formed in the stiffener-engagement surface;
    an ultrasonic-sensor assembly, fixed to the body over the slot such that access to the ultrasonic-sensor assembly, through the slot, is unobstructed by the body; and
    a surface-engagement assembly, comprising a first foot and a second foot, wherein the surface-engagement assembly is movably coupled to the body such that the first foot and the second foot are on opposite ends of the slot of the body and the first foot and the second foot are movable relative to the body and the ultrasonic-sensor assembly.

2. The probe according to claim 1, wherein:
    the first foot is movable between a first retracted position and a first extended position;
    the first foot is further from the stiffener-engagement surface in the first extended position than in the first retracted position;
    the second foot is movable between a second retracted position and a second extended position; and
    the second foot is further from the stiffener-engagement surface in the second extended position than in the second retracted position.

3. The probe according to claim 2, further comprising:
    a first biasing mechanism, coupled to the body and the surface-engagement assembly and configured to bias the first foot into the first extended position; and
    a second biasing mechanism, coupled to the body and the surface-engagement assembly and configured to bias the second foot into the second extended position.

4. The probe according to claim 2, wherein the first foot and the second foot are co-movable relative to each other.

5. The probe according to claim 4, wherein the surface-engagement assembly further comprises a crossbar, movable relative to the body and the ultrasonic-sensor assembly and intercoupling the first foot and the second foot such that translational movement of the crossbar:
    in a first direction away from the stiffener-engagement surface corresponds with movement of the first foot toward the first retracted position and movement of the second foot toward the second retracted position; and
    in a second direction toward the stiffener-engagement surface and opposite the first direction corresponds with movement of the first foot toward the first extended position and movement of the second foot toward the second extended position.

6. The probe according to claim 5, wherein:
    the body further comprises a guiderail; and
    the crossbar comprises a guiderail slot slidably engaged with the guiderail such that the guiderail limits movement of the crossbar to the first direction and the second direction.

7. The probe according to claim 1, wherein the first foot and the second foot are slidable relative to the body along linear paths.

8. The probe according to claim 1, wherein:
the first foot is movable along a first path relative to the body;
the second foot is movable along a second path relative to the body; and
an angle defined between the first path and the second path is perpendicular or oblique.

9. The probe according to claim 8, wherein:
the first foot comprises a first engagement surface configured to engage the hat stiffener;
the first engagement surface is substantially perpendicular to the first path;
the second foot comprises a second engagement surface configured to engage the hat stiffener; and
the second engagement surface is substantially perpendicular to the second path.

10. The probe according to claim 1, wherein:
the first foot comprises a first engagement surface configured to engage the hat stiffener;
the first foot further comprises a first groove formed in the first engagement surface;
the second foot comprises a second engagement surface configured to engage the hat stiffener;
the second foot further comprises a second groove formed in the second engagement surface;
the probe further comprises a fluid chamber open to the ultrasonic-sensor assembly and defined at least partially between the stiffener-engagement surface of the body, the first groove, and the second groove;
the fluid chamber is configured to receive a fluid during non-destructive inspection of the hat stiffener; and
a volume of the fluid chamber changes as the first foot and the second foot move relative to the body and the ultrasonic-sensor assembly.

11. The probe according to claim 1, wherein:
the first foot comprises a first engagement surface configured to engage the hat stiffener;
the first foot further comprises opposing first beveled leading and trailing edges and the first engagement surface is interposed between the opposing first beveled leading and trailing edges of the first foot;
the second foot comprises a second engagement surface configured to engage the hat stiffener; and
the second foot further comprises opposing second beveled leading and trailing edges and the second engagement surface is interposed between the opposing second beveled leading and trailing edges of the second foot.

12. The probe according to claim 1, wherein:
the first foot comprises a first engagement surface configured to engage the hat stiffener;
the second foot comprises a second engagement surface configured to engage the hat stiffener; and
the first engagement surface and the second engagement surface are planar.

13. A system for non-destructively inspecting a hat stiffener, the system comprising:
a robotic arm; and
a probe, fixed to the robotic arm and comprising:
a body, comprising stiffener-engagement surface and a slot formed in the stiffener-engagement surface;
an ultrasonic-sensor assembly, fixed to the body over the slot such that access to the ultrasonic-sensor assembly, through the slot, is unobstructed by the body; and
a surface-engagement assembly, comprising a first foot and a second foot, wherein the surface-engagement assembly is movably coupled to the body such that the first foot and the second foot are on opposite ends of the slot of the body and the first foot and the second foot are movable relative to the body and the ultrasonic-sensor assembly;
wherein the robotic arm is configured to autonomously move the probe along the hat stiffener such that at least a portion of the stiffener-engagement surface of the body contacts the hat stiffener and the first foot and the second foot contact the hat stiffener.

14. The system according to claim 13, wherein:
the hat stiffener comprises a cap portion having a first radius;
the first foot and the second foot are in first positions relative to the body and the ultrasonic-sensor assembly when in contact with the hat stiffener;
the robotic arm is configured to autonomously remove the probe from the hat stiffener and autonomously move the probe along a second hat stiffener, having a second radius that is different than the first radius, such that at least a portion of the stiffener-engagement surface of the body contacts the second hat stiffener and the first foot and the second foot contact the second hat stiffener;
the first foot and the second foot are in second positions relative to the body and the ultrasonic-sensor assembly when in contact with the second hat stiffener; and
the first positions are different than the second positions.

15. A method of non-destructively inspecting a hat stiffener, the method comprising steps of:
contacting a cap portion of the hat stiffener with a stiffener-engagement surface of a body of a probe;
moving a first foot of the probe, relative to the body, to contact a first web portion of the hat stiffener when the stiffener-engagement surface is contacting the cap portion of the hat stiffener;
moving a second foot of the probe, relative to the body, to contact a second web portion of the hat stiffener when the stiffener-engagement surface is contacting the cap portion of the hat stiffener; and
ultrasonically inspecting the cap portion of the hat stiffener with an ultrasonic-sensor assembly, fixed to the body over a slot formed in the stiffener-engagement surface of the body such that access to the ultrasonic-sensor assembly, through the slot, is unobstructed by the body.

16. The method according to claim 15, further comprising steps of:
filling a fluid chamber of the probe with a fluid, the fluid chamber being open to the ultrasonic-sensor assembly and defined at least partially between the stiffener-engagement surface of the body, a first groove formed in the first foot, and a second groove formed in the second foot; and
changing a volume of the fluid chamber by moving the first foot relative to the body and moving the second foot relative to the body.

17. The method according to claim 15, further comprising steps of:
biasing the first foot away from the stiffener-engagement surface and toward the second foot; and biasing the second foot away from the stiffener-engagement surface and toward the first foot.

18. The method according to claim 15, wherein:
the first foot and the second foot are in first positions, relative to the body when in contact with the first web portion and the second web portion, respectively, of the hat stiffener and when the stiffener-engagement surface of the body is in contact with the cap portion of the hat stiffener;
the method further comprises steps of:
removing the probe from the hat stiffener;
contacting a cap portion of a second hat stiffener with the stiffener-engagement surface of the body of the probe, wherein an amount of the stiffener-engagement surface in contact with the cap portion of the second hat stiffener is different than the amount of the stiffener-engagement surface in contact with the cap portion of the first hat stiffener;
moving the first foot of the probe, relative to the body, into a second position to contact a first web portion of the second hat stiffener when the stiffener-engagement surface is contacting the cap portion of the second hat stiffener;
moving the second foot of the probe, relative to the body, into a second position to contact a second web portion of the second hat stiffener when the stiffener-engagement surface is contacting the cap portion of the second hat stiffener; and
ultrasonically inspecting the cap portion of the second hat stiffener with the ultrasonic-sensor assembly; and
the first positions are different than the second positions of the first foot and the second foot.

19. The method according to claim 18, wherein moving the first foot of the probe into the second position and moving the second foot of the probe into the second position comprises co-moving the first foot and the second foot into the second positions.

20. The method according to claim 15, wherein:
the first foot of the probe is moved, relative to the body, along a first path;
the second foot of the probe is moved, relative to the body, along a second path; and
an angle defined between the first path and the second path is perpendicular or oblique.

* * * * *